United States Patent [19]

Torrence

[11] Patent Number: 4,922,384
[45] Date of Patent: May 1, 1990

[54] ILLUMINATED DISPLAY WITH HALF-SILVERED MIRRORS AND DISCRETE REFRACTOR PLATES

[75] Inventor: Arthur L. Torrence, Newtown, Conn.

[73] Assignee: Mechtronics Corporation, Stamford, Conn.

[21] Appl. No.: 363,129

[22] Filed: Jun. 8, 1989

[51] Int. Cl.⁵ ............................................. F21V 8/00
[52] U.S. Cl. .................................... 362/31; 362/32; 362/806; 362/245; 362/308; 40/546; 40/547; 40/442
[58] Field of Search ................... 362/31, 32, 97, 806, 362/242, 243, 244, 245, 246, 247, 249, 307, 297, 298, 299, 327, 328, 346, 308, 309; 40/546, 547, 442, 152.2, 427

[56] References Cited

U.S. PATENT DOCUMENTS

| | | | |
|---|---|---|---|
| 1,348,957 | 8/1920 | Pope | 362/247 |
| 1,990,826 | 2/1935 | Hodgkin | 40/443 |
| 3,736,832 | 6/1973 | Franke et al. | 40/442 |
| 3,868,501 | 2/1975 | Barbour | 40/442 |
| 4,459,642 | 7/1984 | Morc | 362/346 |
| 4,796,170 | 1/1989 | Pedersen et al. | 362/308 |

Primary Examiner—Ira S. Lazarus
Assistant Examiner—D. M. Cox
Attorney, Agent, or Firm—Haynes N. Johnson

[57] ABSTRACT

An illuminated picture display having a surrounding scintilating show of lights, including a housing holding a front half-silvered mirror and a rear mirror, the mirrors being proximate to one another and at a small angle to one another, congruent openings in the mirrors to receive a transparency for display, a light within the housing for illuminating the transparency, a plurality of lamps between the mirrors along the periphery, and a programmed timer causing the lamps to blink on and off in predetermined sequence, and a refraction plate mounted in front of the front half-silvered mirror proximate to the opening in the front mirror, so that the transparency is displayed surrounded by a flashing light display. A fiber optics system may be used instead of the plurality of lamps.

24 Claims, 6 Drawing Sheets

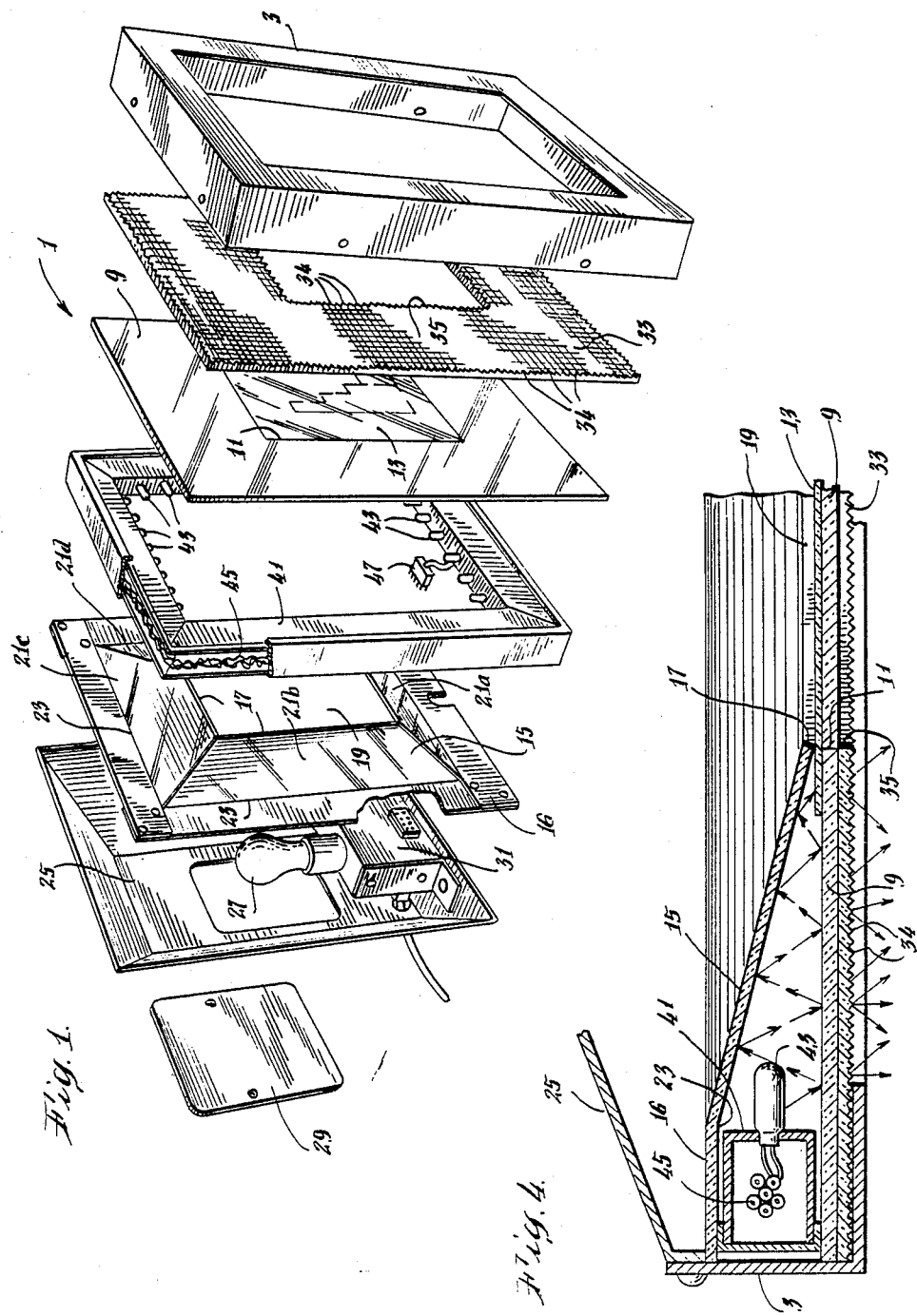

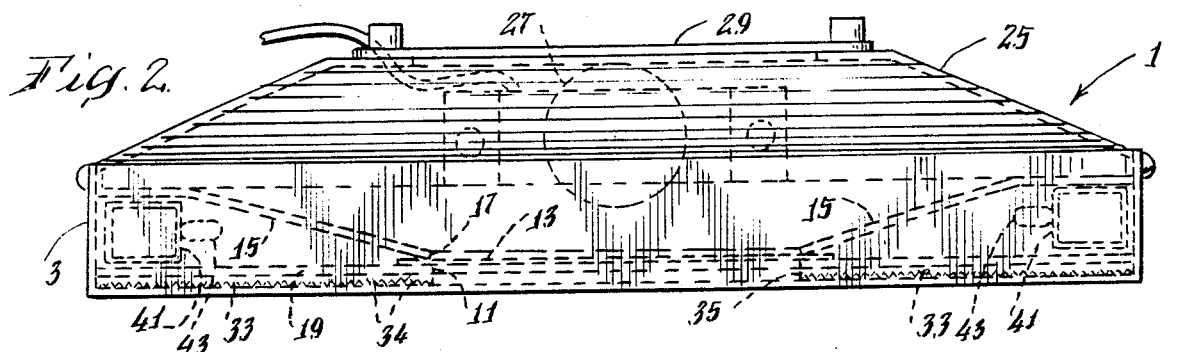
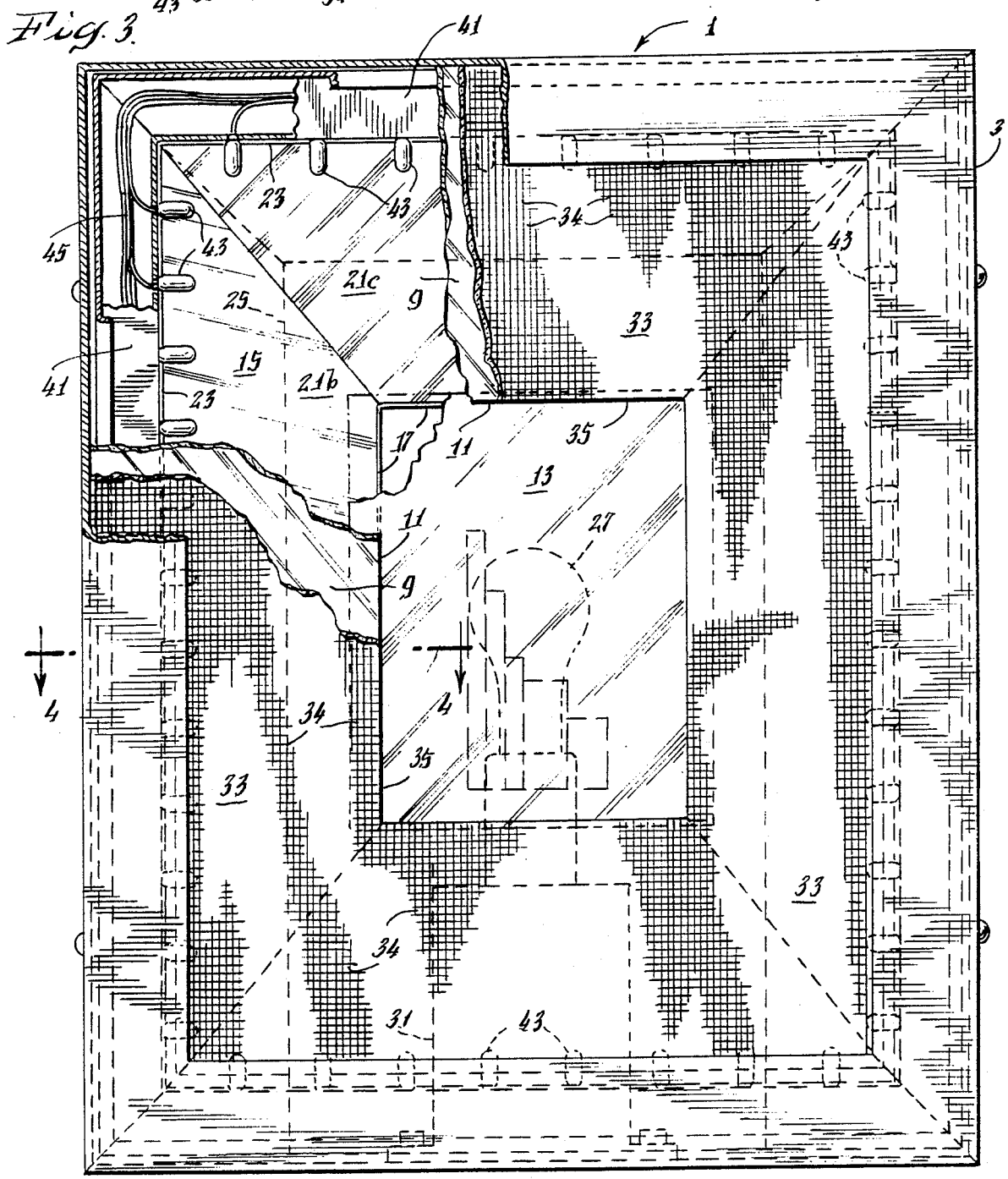

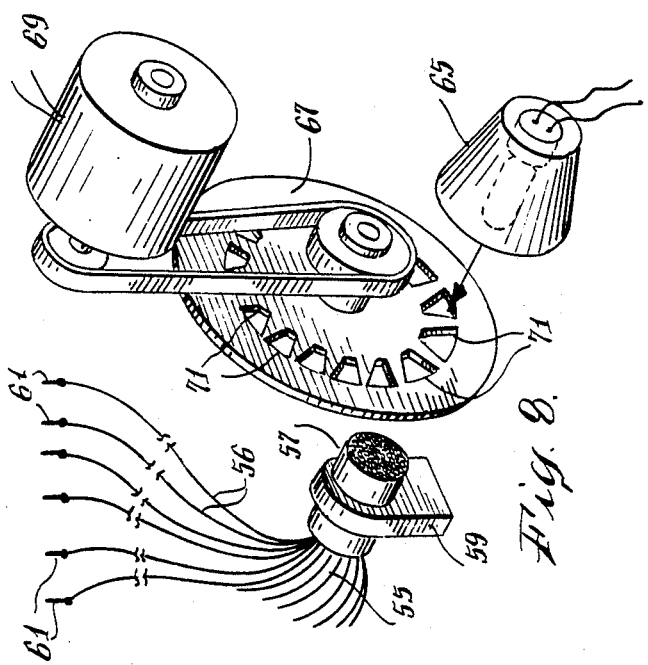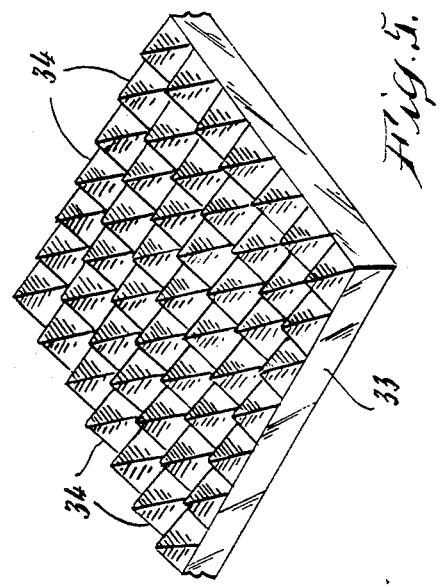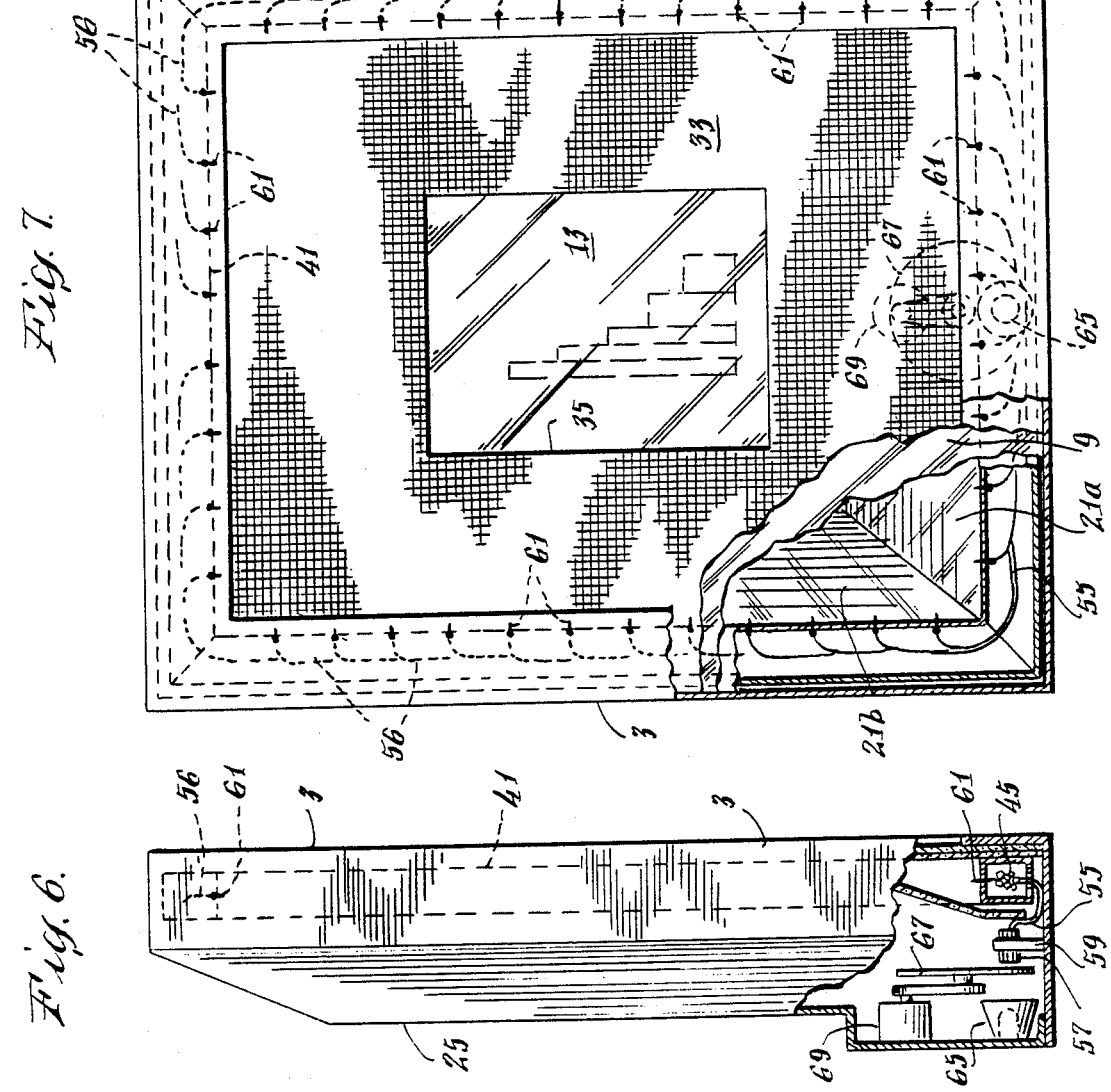

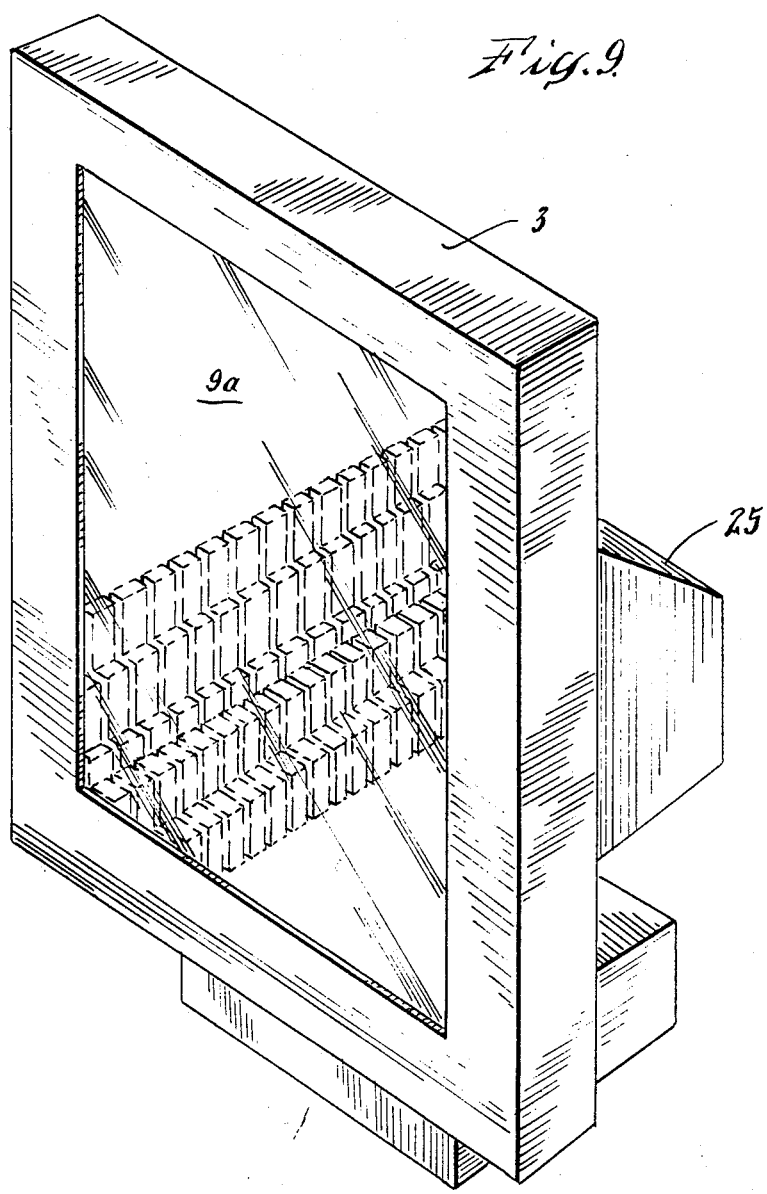

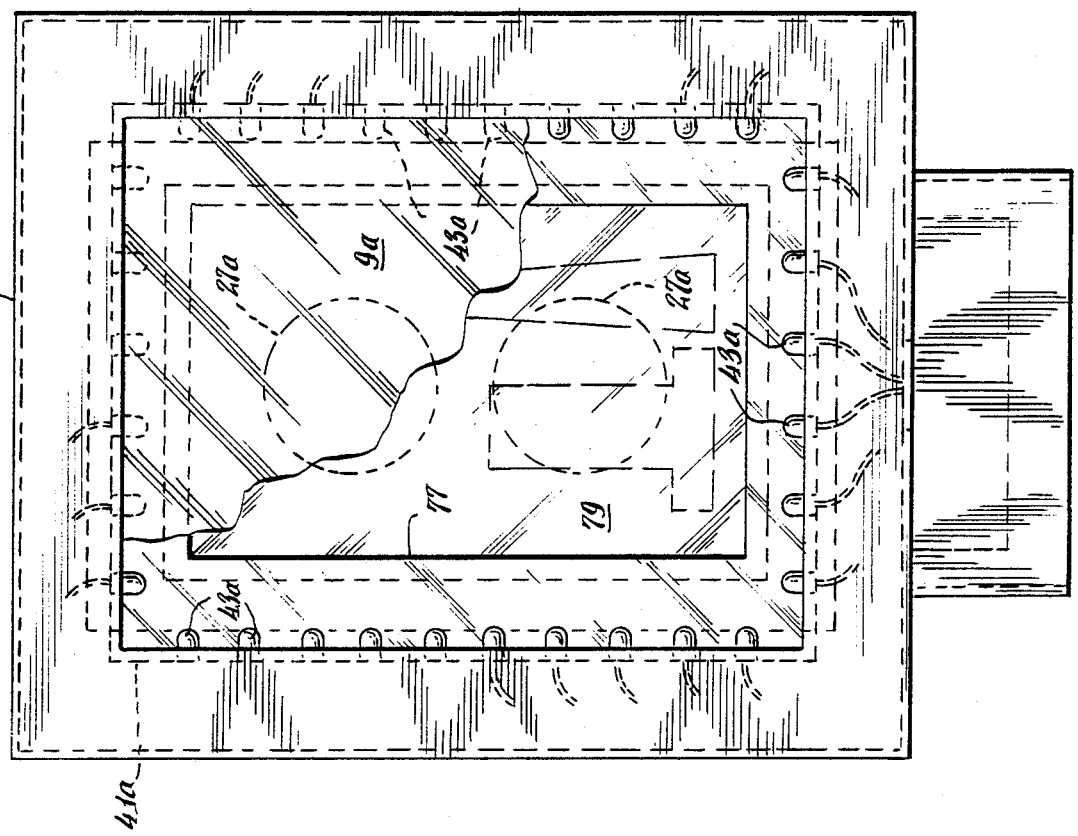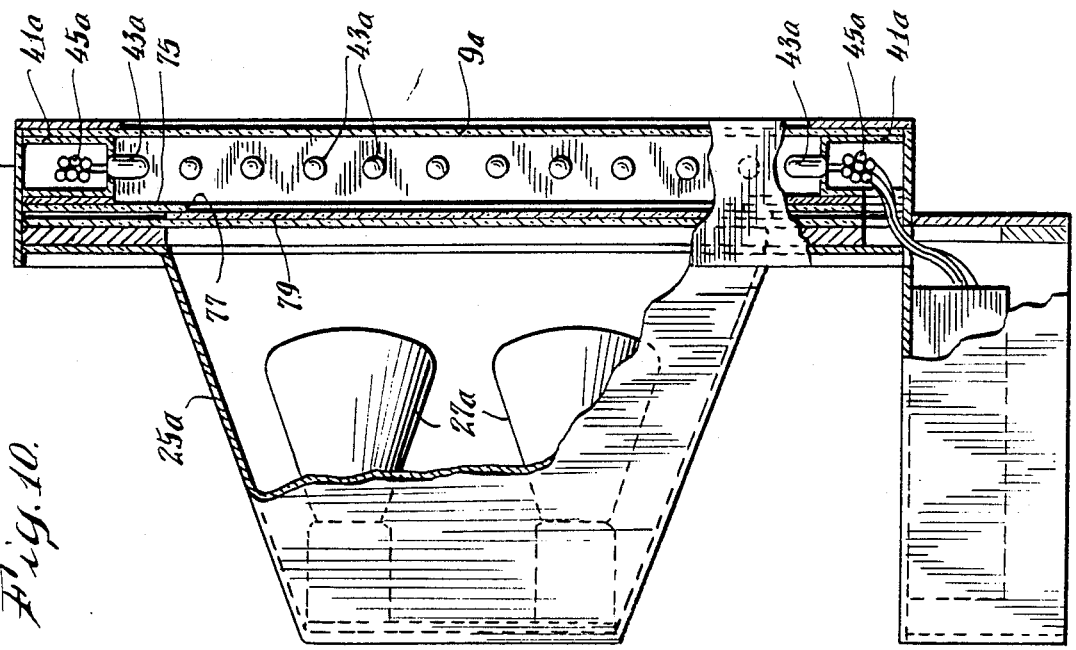

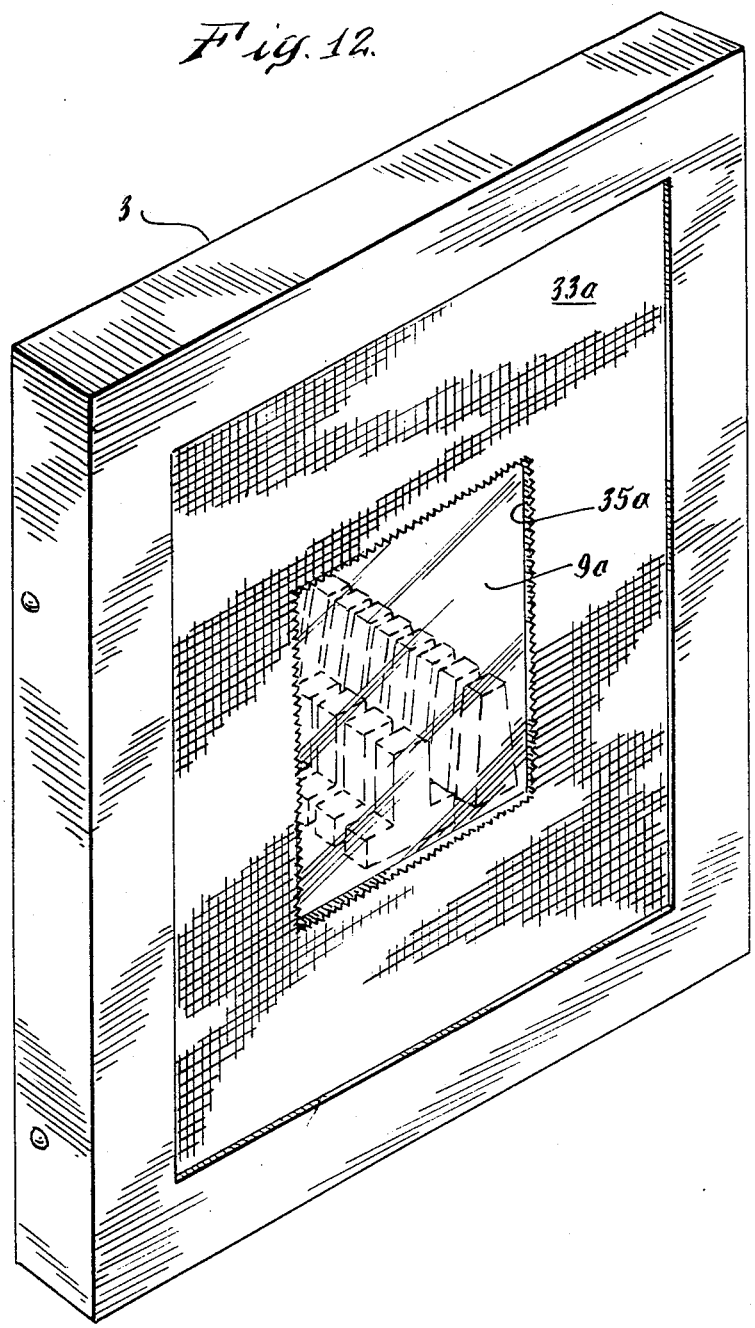

4,922,384

ILLUMINATED DISPLAY WITH HALF-SILVERED MIRRORS AND DISCRETE REFRACTOR PLATES

FIELD OF THE INVENTION

This invention relates to the field of illuminated displays, often used for advertising, and, in particular, to displays which create multiple images of an object or of lights. It is a variation on the "infinity mirror" concept, however, one of the two mirrors used is only half-silvered, may be other than parallel to the other mirror, and may be partially covered by a discrete refractor plate to enhance the illusion.

BRIEF SUMMARY OF THE INVENTION

The first version of my invention uses a half-silvered front mirror with an opening in the center holding a photographic transparency, or other transparent or translucent artwork, to be displayed. Behind the front mirror is a back mirror of the same size, but shaped like a truncated four-sided pyramid, the truncated portion being open and of the same size and shape as the opening in the front mirror, and with the edges of the truncated portion contacting the back surface of the front mirror. Illumination for the transparency is positioned behind the truncated opening.

The four sides of the back mirror angle away from the front mirror as they pass from the opening to the sides and bottom of the display. A plurality of lamps is positioned along the periphery of the space between the two mirrors. These lamps can blink individually, in a pre-programmed pattern, or remain continually on. Light from these lamps is reflected back and forth between the two mirrors and towards the center of the display. A portion of the light passes through the half-silvered mirror upon each reflection. A discrete refraction sheet of clear acrylic plastic, having a multiply-pyramided surface, or any other prismatic or discrete lenticular pattern, is placed in front of and over at least a portion of the front mirror. This serves to produce multiple refractions going in various directions. As a result, the area around the transparency has the illusion of a sparking display of light, i.e., scintillations.

A fiber optic light distribution system, providing for the creation of pre-programmed patterns of distributed light, can be used in lieu of separate lamps.

A modification of this invention again uses a half-silvered front mirror. The rear mirror is parallel to the front mirror and includes an opening in the middle portion to hold a transparency showing the product being advertised. The transparency is illuminated from the rear. The parallel mirrors result in multiple reflections of the transparency, and the half-silvered front mirror permits the resulting multiple images to be seen from in front of the display. Portions of the front mirror may be covered by a discrete refraction sheet.

DESCRIPTION OF THE DRAWINGS

FIG. 1 is an exploded perspective view of my illuminated display.

FIG. 2 is an end elevation.

FIG. 3 is a front elevation, partially broken away.

FIG. 4 is a partial section, taken on line 4—4 of FIG. 3, showing the relationship of the front and back mirrors and the nature of the internal multiple internal reflections. The front half-silvered mirror and the discrete refraction sheet are at the bottom of the figure; and representations of the emerging light pattern are indicated.

FIG. 5 is a portion of the clear plastic, discrete refraction sheet used to refract the exiting light. In this instance it is in the form of a series of uniformly spaced, similar pyramids.

FIG. 6 is a side elevation, partially broken away, showing the use of a fiber optic device to produce the light, instead of the multiple lamps shown in FIGS. 1 to 4.

FIG. 7 is a front plan view of the display of FIG. 6 showing the fiber optic harness used for distributing the light.

FIG. 8 is a detail of the fiber optic pattern producing device.

FIG. 9 is a front perspective view of the modified form of my invention in which the front mirror is, again, half-silvered and the rear mirror is parallel to the front mirror.

FIG. 10 is a side elevation, partially broken away, of this modification.

FIG. 11 is a front elevation, partially broken away, of this modification.

FIG. 12 is a modification of the FIG. 9 display in which a portion of the front half-silvered mirror is covered by a discrete refraction sheet.

DETAILED DESCRIPTION OF THE INVENTION

I turn first to the illuminated display 1 shown in FIGS. 1 to 4. This display is mounted in frame 3 and has, in front, a plane, half-silvered mirror 9 with a central opening 11 in it in which is mounted a photographic transparency 13 showing a picture of, for example, a product being advertised. This transparency may also be any other transparent or translucent artwork or a silhouette. By "half-silvered" mirror I refer to what may also be called a "see-through" mirror, that is, a mirror which reflects a portion of the light and transmits the remainder.

A rear mirror 15 (not half-silvered), of the same overall size as mirror 9, is mounted within the frame behind mirror 9. It has an opening 19 in it behind opening 11 and of about the same size. This is not a plane mirror but has the shape of a truncated, four-sided pyramid. The four sides 21a, 21b, 21c, and 21d can be seen in FIG. 1. The mirror's upper, inner edges are identified by the numeral 17, and the edges at the base of the pyramid by the numeral 23. I have found that an angle of between about 15° and about 30° works well.

A source of illumination is positioned at the back of frame 3 and is so located as to pass light through openings 19 and 11. It includes rear reflector 25, lamp 27, cover plate 29, and transformer 31 (for lamps 43). If desired, lamp 27 can be replaced with a series of smaller, low voltage bulbs, so that 110 volt line voltage can be kept entirely out of the display.

A discrete refraction plate 33 is mounted in front of front mirror 9. By "discrete refraction plate," I refer to a sheet 33 (FIG. 5) of clear plastic, such as acrylic, which has at least one surface which is not planar; rather, the surface has a pattern of different, sharp angles (discontinuities). Such a surface, formed of a series of pyramids 34, each measuring about one-eighth inch in width and one-sixteenth inch high, has been successfully used by me. Other surface shapes, such as prismatic or lenticular, can be used, but a pattern having discrete angles, rather than smooth, diffusing curves, is preferable.

Refraction plate 33 has an opening 35 in it to permit the transparency 13 to be seen. Plate 33 may cover all or a part of the front mirror 9 or not be used at all.

A lamp channel 41 is mounted between the two mirrors and proximate to the inside of frame 3. It extends about the entire periphery of the mirrors. Channel 41 carries a series of small lamp bulbs 43 which project inwardly between mirrors 9 and 15. The bulbs are connected by wiring harness 45 and plug 47 to plug 32 on transformer 31. What is referred to as a transformer may be not only a transformer but also a pre-programmed timer to control the blinking of the lamps. The blinking may be random or in accordance with the program or be steady.

In use, transparency 13 is mounted in the display and the unit turned on. Lamp 27 illuminates the transparency. Along the periphery of the unit, lamps 43 blink. As shown in FIG. 4, the light rays from lamps 43 are reflected back and forth between mirrors 9 and 15 and move towards the center of the display. Since mirror 9 is half-silvered, some of the light hitting mirror 9 is transmitted, rather than reflected. This transmitted light passes through refraction plate 33 and is refracted in many different directions. The appearance to the viewer is one of hundreds of scintillations or twinklings.

If desired, opening 11 may be covered with a half-silvered mirror, the transparency disappears when the lamp is off. Opening 11 may, alternatively, be in the shape of an item being illuminated, such as a beer bottle, in this event, a "floating" image is achieved which can have a striking effect.

An alternative to using lamps 43 is to use a fiber optic system of illumination as shown in FIGS. 6, 7, and 8. This system uses a harness 55 made up of a plurality of optical fibers 56 (one for each desired lamp replacement). The fibers are bundled together at their inner end 57 and held by frame 59 facing light source 65. The outer ends 61 of the bundle of optical fibers are located in positions corresponding the where lamps 43 would have been. A disk 67, rotated by motor 69, is positioned between end 57 and light 65. The disk has a series of patterned openings 71 which serve alternately to block the light from reaching the ends 57 or to permit its passage. The openings can be of any desired size and shape so as to provide for a desired predetermined, programmed pattern of light. This light pattern is then transmitted through the optical fibers to the their outer ends 61 and is thereafter reflected between mirrors 9 and 15 as before. Alternatively, or in addition, openings 71 may be covered with colored filters, resulting in color changes in the resulting reflected light.

A modification of the structure of FIGS. 1 to 5 is seen in FIGS. 9 to 11. This structure includes a front half-silvered mirror 9a, but one without an opening. It includes a rear mirror 75 which is planar rather than being in the form of a truncated pyramid. The rear mirror includes an opening 77 to hold a transparency 79. A variation would be to have opening 77 hold a mirror carrying an engraved pattern, message, or picture. The structure of this modification includes a rear reflector 25a with light source 27a, but does not necessarily include a refraction plate. As with the first version of my invention, the structure may include a lamp channel 41a carrying lamps 43a connected by wiring harness 45a. Alternatively, it may be illuminated with a fiber optic system similar to the one described above.

In use, lamp 27 illuminates transparency 79, which can then be viewed through the half-silvered front mirror 9a. In addition, the image from the transparency will also be reflected back from the front mirror to the rear mirror 75. Multiple reflections will occur between these two mirrors with a portion of the reflections also passing through front mirror 9a. The result is that the viewer will see multiple images of the transparency; but, if lamp 27 is off, the images disappear, and only a mirror is seen. Lamp 27 can, if desired, be programmed.

A further modification of the structure of FIGS. 9 to 11 is seen in FIG. 12. Here there is a refraction plate 33a in front of front mirror 9a to create illusions similar to those found in the first form of my invention. Plate 33a will require an opening 35a at least as large as the transparency 79, but if desired it may be larger. The size of the opening determines the relative amount of multiple reflections seen in comparison with the amount of scintillations.

I claim:

1. An illuminated display for displaying a transparency, said display including
    a housing, a half-silvered mirror mounted at the front of said housing,
    a second mirror mounted within said housing behind said half-silvered mirror and spaced therefrom, an unsilvered opening in said second mirror,
    a plurality of light sources mounted within said housing between said mirrors and about the periphery thereof, and
    means, within said housing and behind said opening, to illuminate said transparency,
    whereby said transparency will produce an image visible at said half-silvered mirror and the light from said plurality of light sources will be multiply-reflected between said mirrors to produce multiple images thereof.

2. An illuminated display as set forth in claim 1 in which said transparency is mounted within said opening in said second mirror.

3. An illuminated display as set forth in claim 1 in which said half-silvered mirror includes an unsilvered area in front of said opening and said transparency is mounted in said area.

4. An illuminated display as set forth in claim 1 and including a discrete refraction plate mounted in front of said half-silvered mirror and covering a portion thereof, whereby light from said plurality of lamps will be multiply-refracted.

5. An illuminated display as set forth in claim 4 in which said refraction plate has one surface formed in the shape of a multiplicity of pyramids.

6. An illuminated display as set forth in claim 4 in which said refraction plate has a lenticular surface.

7. An illuminated display as set forth in claim 1 including means for blinking said plurality of light sources in a predetermined sequence.

8. An illuminated display as set forth in claim 1 in which said plurality of light sources is a fiber optics system including a plurality of optical fibers leading from a fiber optic light source to individual outlet areas between said mirrors.

9. An illuminated display as set forth in claim 8 including means between said fiber optic light source and said plurality of optical fibers for interrupting the passage of light in a predetermined manner.

10. An illuminated display as set forth in claim 8 including means between said fiber optic light source and said plurality of fibers for changing the color of light passing to said plurality of optical fibers.

11. An illuminated display as set forth in claim 1 in which said second mirror is in the shape of a truncated pyramid with the truncated portion thereof proximate to said half-silvered mirror.

12. An illuminated display as set forth in claim 11 in which said mirrors are at an angle to one another of between about 15° and about 30°.

13. An illuminated display as set forth in claim 11 including a discrete refraction sheet positioned in front of portions of said half-silvered mirror.

14. An illuminated display as set forth in claim 13 in which said refraction sheet has one surface formed in the shape of a multiplicity of pyramids.

15. An illuminated display as set forth in claim 1 in which said unsilvered opening is in a predetermined shape defining an image.

16. An illuminated picture display having a surrounding scintillating show of lights, said display including
    a housing having mounted therein a front half-silvered mirror and a rear mirror, said mirrors being proximate to one another and at a small angle to one another,
    congruent openings in said mirrors to receive a transparency for display, means within said housing for illuminating said transparency,
    a plurality of light sources between said mirrors along the periphery thereof, and means causing said plurality to blink on and off, and
    a refraction plate mounted in front of at least portions of said front half-silvered mirror proximate to said opening in said front mirror,
    whereby said transparency may be displayed surrounded by a flashing light display.

17. An illuminated picture display as set forth in claim 16 in which said rear mirror is in the shape of a truncated pyramid.

18. An illuminated picture display as set forth in claim 17 in which said mirrors are at an angle to one another of from about 15° to about 30°.

19. An illuminated picture display as set forth in claim 16 in which said refraction sheet is discrete.

20. An illuminated picture display as set forth in claim 16 in which said plurality of light sources is a fiber optics system, said system including a bundle of fiber optics and a light source.

21. An illuminated picture display as set forth in claim 20 in which said fiber optics system includes means for interrupting said light source in a predetermined manner.

22. An illuminated picture display as set forth in claim 20 including means for changing the color of light received by said bundle.

23. An illuminated picture display as set forth in claim 16 in which one of said openings has therein a mirror having an engraved image thereon.

24. An illuminated picture display having a surrounding scintillating show of lights, said display including
    a housing having mounted therein a front half-silvered mirror and a rear mirror, said mirrors being proximate to one another and parallel to one another,
    an opening in said rear mirror to receive a transparency for display, means within said housing for illuminating said transparency,
    a plurality of light sources between said mirrors along the periphery thereof, and means causing said plurality to blink on and off in a programmed manner, and
    a discrete refraction plate mounted in front of at least portions of said front half-silvered mirror proximate to said opening in said front mirror,
    whereby said transparency may be displayed surrounded by a flashing light display and said transparency will disappear from view when said illuminating means is off.

* * * * *